No. 763,751. PATENTED JUNE 28, 1904.
E. D. HARRIS.
OVEN FOR GAS, GASOLENE, OR OIL STOVES.
APPLICATION FILED JULY 28, 1903.
NO MODEL.
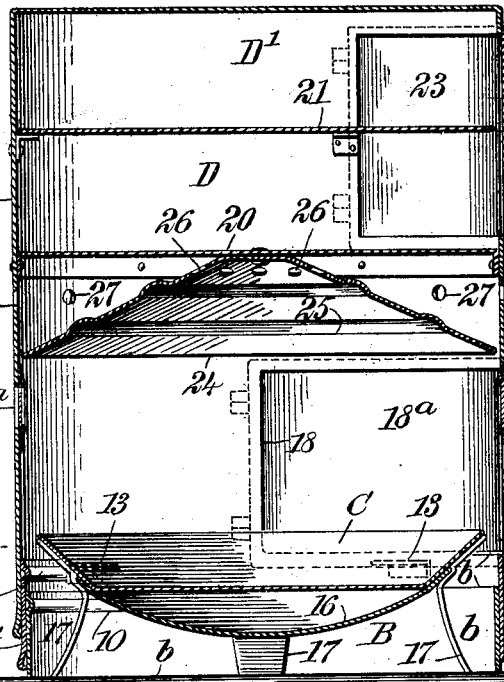
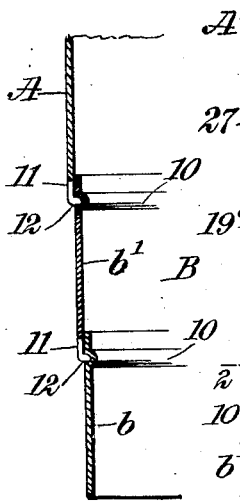
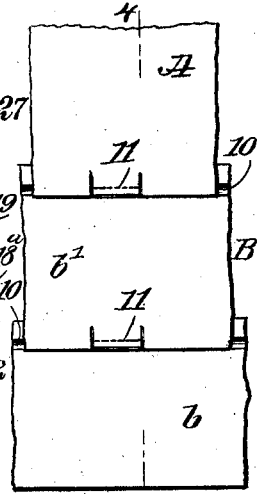
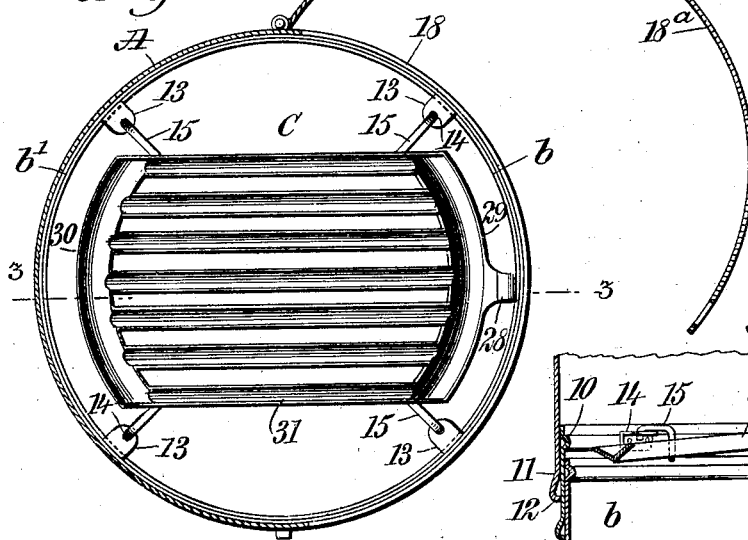
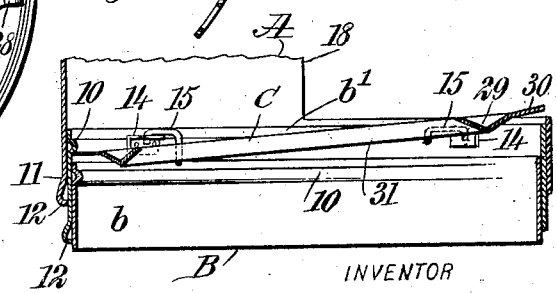
WITNESSES:
INVENTOR
Ella D. Harris
BY Munn & C
ATTORNEYS.

No. 763,751. Patented June 28, 1904.

UNITED STATES PATENT OFFICE.

ELLA D. HARRIS, OF NEW YORK, N. Y.

OVEN FOR GAS, GASOLENE, OR OIL STOVES.

SPECIFICATION forming part of Letters Patent No. 763,751, dated June 28, 1904.

Application filed July 28, 1903. Serial No. 167,299. (No model.)

*To all whom it may concern:*

Be it known that I, ELLA D. HARRIS, a citizen of the United States, and a resident of the city of New York, borough of Brooklyn, in the county of Kings and State of New York, have invented a new and Improved Oven for Gas, Gasolene, or Oil Stoves, of which the following is a full, clear, and exact description.

My invention relates to an oven especially adapted for use in connection with gas, gasolene, or oil stoves.

The purpose of the invention is to provide a construction which will be simple, durable, light, and effective and such that the base can be vertically adjusted to place a pan, griddle, gridiron or broiler, or other cooking vessel or utensil employed in the desired relation to the flame.

Another purpose of the invention is to provide the oven proper with an associated warming-oven and to so construct the base of the oven that any character of cooking utensil may be removably supported thereon, and, further, to construct a broiler especially adapted to the oven and of such formation that the juices escaping from the article being cooked will be caught and preserved for gravy or other purposes.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the improved oven, illustrating a leg-supported tray in connection therewith adapted to contain a pan or other cooking vessel. Fig. 2 is a horizontal section taken practically on the line 2 2 of Fig. 1, illustrating the application of the cooking vessel or utensil to the base of the oven without the assistance of a tray. Fig. 3 is a transverse section taken practically on the line 3 3 of Fig. 2. Fig. 4 is a vertical section through a portion of the body and base of the oven, illustrating the manner in which its sections are adjusted and locked in adjusted position, the section being taken substantially on the line 4 4 of Fig. 5; and Fig. 5 is an exterior view of the parts shown in Fig. 4.

The oven is constructed, preferably, of sheet-iron, although other material may be employed, and primarily the oven consists of an upper body-section A, which is in one member, and a base-section B, which is in two or more members. As illustrated, however, the base-section B comprises two members $b$ and $b'$, and these members have telescopic relation to each other, as has likewise the upper or body section A telescopic relation to the base-section B, as is shown in Fig. 1. The body-section may be adjusted on the base-section and the members of the base-section upon themselves in any suitable or approved manner and may be locked in desired position. As illustrated, however, the adjustment is rendered possible and the locking connection is effected by producing annular channels 10 in the members $b$ and $b'$ of the base-section, which channels may be in any desired number, and in providing at the lower edge of the upper base member $b'$ and the lower edge of the body-section A one or more lips 11, terminating at their bottom portions in inwardly-extending knobs or flanges 12, (shown best in Fig. 4,) which flanges as the various parts are adjusted are adapted to enter the channels 10, and thus hold the parts in their adjusted position.

The upper member $b'$ of the base-section A is provided with any desired number of brackets 13, the upper portions of the brackets being horizontal and provided with apertures 14. The said brackets are secured in any suitable or approved manner to the inner face of the aforesaid upper base member $b'$, as is illustrated in Fig. 2.

The cooking utensil or vessel C may be made to rest on the horizontal portions of the brackets 13 or in the event the vessel or utensil is not sufficiently large to engage directly with the brackets, or if it is desirable that a large space should intervene the utensil or vessel and the sides of the base, the utensil or vessel C is provided with angular arms 15, extending from suitable points, the vertical members of which arms are adapted to enter the apertures 14 in the brackets 13, as is shown in Fig. 2.

It is sometimes desirable, for example, when the articles are to be baked to support the baking-pan or other utensil employed in a tray 16, which tray when employed as is shown in Fig. 1 is independent of the base and is supported by legs 17, adapted to straddle the flame. Preferably the said tray, as illustrated, is provided with a convexed bottom, so as to provide for an equal distribution of the heat striking the said bottom.

The lower portion of the body-section A has an opening 18 produced therein adapted to be closed by a door 18$^a$, and in this door a sight-opening 19 is produced covered by mica or other transparent material, and in the body-section itself one or more sight-openings 19$^a$ of similar character are preferably made. These sight-openings are so placed that a person when the oven is closed may readily watch the article being cooked.

The body-section A of the oven is provided at its upper portion preferably with two partitions 20 and 21, the lower partition 20 engaging with the inner face of the body-section throughout the peripheral portion of the partition, but preferably having some space between a portion of the periphery of the upper partition 21 and the side of the said body-section of the oven, as is shown in Fig. 1, so that the heated air in the lower compartment D thus formed may find its way up into the upper compartment D', and these compartments D and D' are adapted as warming-compartments to receive dishes or material that has been cooked and which it is desirable to keep warm.

Access is obtained to the warming-compartments D and D' through the medium of a second door 23, located at the upper portion of the body-section of the oven, as is also shown in Fig. 1.

In order to force the heat in the main chamber of the oven downward upon the upper surface of the article being cooked, I employ a conical reflecting-cap 24, which is secured in any approved manner to the under face of the lower partition 20, as is illustrated in Fig. 1, and this reflecting-cap is provided usually with annular depressions 25 in its inner face to retain the heat to a greater or less extent, and the said reflecting-cap is further provided with apertures 26 at its upper portion, which apertures permit of the escape of more or less heat, and the escaping heat mixes with atmospheric air entering the main chamber of the oven above the reflecting-cap through apertures 27, also shown in Fig. 1. In this manner the normal or maximum quantity of heat is obtained whereby to heat the warming-compartments D and D' of the oven.

In Figs. 2 and 3 I have illustrated an especial construction of broiler adapted particularly for use in connection with the improved oven. This broiler is provided with the aforesaid angular supporting-arms 15 and with a handle 28 at its forward end. The forward end 29 of the broiler is in the shape of a trough, as is likewise the rear end 30 and the longitudinal members 31, connecting the forward and the rear ends. All of the members just mentioned, with the exception of the handle and the supporting-arms 15, are preferably made V-shaped in cross-section, as is shown in Fig. 3, the idea of this special construction being to provide a broiler which will receive and retain the juices from the meat, for example, being cooked and will conduct the said juices to the rear trough-section 30. To that end the rear supporting-arms 15 are longer than the forward supporting-arms, so that the broiler will have a downward and a rearward inclination. (Clearly shown in Fig. 3.)

This oven is exceedingly simple. It is economic, durable, and effective, and it is portable and may be placed over the burner of any stove using oil, gas, or gasolene as a fuel. It will be understood that the base is open at the top and the bottom, while the body-section A is closed at the top and sides and is open at the bottom only.

I desire it to be understood that the supports for the cooking utensil can be attached to the lower base-section instead of the top base-section and that, if desired, supports for the cooking utensils can be provided for both sections of the base, so that practically two shelves are obtainable for cooking purposes.

Having thus described my invention, I claim as new and desire to secure by Letters Patent—

1. In an oven for gas and oil stoves, a base constructed of telescopic members, the upper end of one member being received into the lower end of the member next above it, a body-section mounted upon said base, the upper end of the base being received into the lower end of the body-section, and integral interlocking portions at the upper and lower ends of the sections for locking the sections together.

2. In an oven for gas and oil stoves, a base constructed in telescopic members, a body-section telescopically mounted on the said base, locking devices whereby the members of the base may be held in adjusted position and the body-section in adjusted position on the base, a reflecting-cap supported within the body over the said base, brackets extending from the inner side of the upper member of the base, a cooking utensil, and arms carried by the utensil, adapted to enter the apertures in the said brackets, as described.

3. An oven for gas and oil stoves, comprising a base constructed in adjustable members, a body adjustable upon the base, means for locking the members of the base in adjusted position and for locking the body of the oven in adjusted position on the base, a support for a cooking utensil located within the base, a compartment formed at the upper portion of the body-section, adapted as a warming-compartment, a reflecting-cap secured to the bottom portion of the said compartment, extending over the said base, the reflecting-cap having openings therein at a point below the warming-compartment and the body-section being provided with openings leading into the space between the reflecting-cap and the bottom of the warming-compartment, and means substantially as described, for obtaining access to the warming-compartment and to the main compartment of the oven in which the support for the cooking utensil is located, as described.

4. In an oven for gas and oil stoves, an open base, brackets attached to the said base, a broiler having trough-shaped forward and rearward ends, straight longitudinal trough-shaped members connecting said front and rear troughs, and angular supporting-arms carried by the broiler and adapted for engagement with said brackets, the arms at one end of the broiler being longer than those at the other end to cause the broiler to depend in a position bringing one trough below the level of the other.

5. In an oven for gas and oil stoves, a body-section and a base constructed of telescopic members, the upper end of one member being received into the lower end of the member next above it, the upper ends of said members being provided on their outer side with horizontally-disposed channels, the lower ends of said members being provided with vertical slits spaced apart and extending upwardly from said ends to form the portion of metal between said slits into spring-lips, and inturned flanges on said lips to engage said channels to lock the telescoping parts of said base together.

In testimony whereof I have signed my name to this specification in the presence of two subscribing witnesses.

ELLA D. HARRIS.

Witnesses:
J. FRED. ACKER,
JNO. M. RITTER.